(12) United States Patent
Koehler

(10) Patent No.: US 6,580,788 B1
(45) Date of Patent: Jun. 17, 2003

(54) SYSTEM AND METHOD FOR IDENTIFYING MODEM CONNECTIONS IN A TELEPHONE NETWORK

(75) Inventor: James R. Koehler, Boulder, CO (US)

(73) Assignee: Qwest Communications International, Inc., Denver, CO (US)

( * ) Notice: Subject to any disclaimer, the term of this patent is extended or adjusted under 35 U.S.C. 154(b) by 51 days.

(21) Appl. No.: 09/608,495

(22) Filed: Jun. 30, 2000

(51) Int. Cl.[7] .................. H04M 15/00; H04M 11/00
(52) U.S. Cl. .................. 379/112.06; 379/93.01; 379/114.01; 379/114.28; 379/124; 370/354
(58) Field of Search .................. 379/111, 112.01, 379/112.06, 112.07, 112.08, 114.28, 133, 134, 137, 139, 230, 93.01, 93.07, 114.01, 114.06, 114.5; 370/352, 353, 355

(56) References Cited

U.S. PATENT DOCUMENTS

| | | | | |
|---|---|---|---|---|
| 4,197,427 A | * | 4/1980 | Hutcheson et al. | 379/133 |
| 4,291,200 A | * | 9/1981 | Smith | 179/18 |
| 4,907,256 A | * | 3/1990 | Higuchi et al. | 379/137 |
| 5,490,199 A | * | 2/1996 | Fuller et al. | 379/1 |
| 5,712,908 A | * | 1/1998 | Brinkman et al. | 379/119 |
| 5,854,835 A | * | 12/1998 | Montgomery et al. | 379/119 |
| 5,905,785 A | * | 5/1999 | Dunn et al. | 379/113 |
| 5,946,386 A | * | 8/1999 | Rogers et al. | 379/265 |
| 6,011,838 A | * | 1/2000 | Cox | 379/113 |
| 6,259,778 B1 | * | 7/2001 | Corwith | 379/115 |
| 6,282,267 B1 | * | 8/2001 | Nolting | 379/34 |
| 6,298,123 B1 | * | 10/2001 | Nolting et al. | 379/112 |
| 6,351,453 B1 | * | 2/2002 | Nolting et al. | 370/234 |
| 6,415,024 B1 | * | 7/2002 | Dunn et al. | 379/115.05 |

* cited by examiner

Primary Examiner—Binh Tieu
(74) Attorney, Agent, or Firm—Marsh Fischmann & Breyfogle LLP

(57) ABSTRACT

A system and method provides for the identification of termination telephone numbers in a telephone network which are being employed as a data network modem. When a local exchange carrier (LEC) routes a call to another telecommunications network, such as one used by a competitive local exchange carriers (CLECs), it may be advantageous for reciprocal compensation purposes to identify which termination telephone numbers serviced by the CLECs are acting as modems. As such, all telephone traffic to a particular CLEC is monitored over a predetermined period of time. The information gathered is then processed and segregated according to terminating telephone number. At that point, comparisons may be made against reference information to determine whether the terminating telephone number is a modem or a non-modem.

13 Claims, 5 Drawing Sheets

SYSTEM AND METHOD FOR IDENTIFYING MODEM CONNECTIONS IN A TELEPHONE NETWORK

FIELD OF THE INVENTION

The invention described herein relates to a system and method for monitoring traffic between telephone networks, and more particularly to determining which termination telephone numbers are being employed as data connections.

BACKGROUND OF THE INVENTION

Local exchange carriers (LEC's) in large metropolitan areas can pay in the tens of millions of dollars per year for the ability to terminate intrastate calls to competitive local exchange carriers (CLECs). These payments are known as reciprocal compensation, and can be quite significant for the LECs. One type of traffic which may flow to the CLECs are data calls initiated by computer users wishing to establish a connection with a Internet service provider (ISP) with a termination telephone number which is serviced by a particular CLEC. In many cases, the connection time to termination telephone numbers which are being employed by ISPs may be very large. According to the formula for reciprocal compensation, connect time to a termination number serviced by a CLEC will effect the amount of fees payable by the LEC to the particular CLEC.

According to a recent ruling by the Federal Communications Commission (FCC), Internet traffic was judged to be jurisdictionally mixed and appears to be largely interstate in nature. Noted in particular, were those calls that do not terminate at the local ISP's local server, but continue to their ultimate destinations, specifically at websites that are often located in other states or countries. As a result, it was found that although some Internet traffic is intrastate, a substantial portion of the Internet traffic may be interstate and therefore subject to federal jurisdiction. In one view, if this type of traffic is subject to federal rather than local jurisdiction, it is then taken outside the realm of reciprocal compensation. As such, the ability to identify which termination telephone numbers serviced by CLECs are for establishing data connections, may have an affect on the amount of reciprocal compensation which is paid from one local exchange carrier to another.

SUMMARY OF THE INVENTION

The inventor has recognized that in order to identify termination telephone numbers which are acting as modem connections for ISPs or other means for establishing a data connection, certain characteristics of telephone calls to the termination number may be detected and measured. If enough characteristics of a particular call indicate that the destination number is being used as a data connection, certain confirmation processes may be performed to ultimately determine that this connection is a modem or it may be simply labeled as such.

Described herein is a system and apparatus for identifying terminating telephone numbers in a telecommunications network which are employed as a modem. More particularly, the system and apparatus provide the capability for one party such as a local exchange carrier (LEC) to determine terminating phone numbers serviced by a second party such as a competitive local exchange carrier (CLEC) which are providing modem connection to a data network such as the Internet. The system described herein is configurable to analyze telephone traffic in both directions.

In a telecommunications network, monitoring may be performed at a point, such as a switch, where telephony traffic is being routed to a designated area. This monitoring may be performed to extract predetermined information with regards to calls placed to particular terminating telephone numbers within the designated area. Information gathered while monitoring over a predetermined period of time may be compiled such that selected information about particular terminating telephone number may be generated.

For example, in the situation where the telephone calls are being routed to terminating telephone numbers serviced in the designated area, individual file listings may be created for each terminating number to which a telephone call was successfully made. Other information which may be generated includes originating telephone number for the successful call, terminating telephone number for the successful call, call conversation minutes of use per successful call, as well as date of the successful call. This information may be gathered over the predetermined period of time, such as a week or a month, and compiled in the listing created for the particular terminating telephone number.

Once the information is gathered in the listing, it may then be compiled into the selected categories which may be further analyzed to make a determination as to whether the terminating telephone number is a data modem. The selected categories of information compiled may include, for each terminating telephone number, the total minutes of use (TMOU) over the predetermined period of time, an average hold time (AHT) for the successful calls over the first predetermined period of time, average minutes of use (AMOU) per originating caller over the first predetermined period of time as well as the total number of different callers which place calls to the termination telephone number during the first predetermined period of time (Ncallers).

The above compiled information in the different categories may then be compared against reference values in order to determine whether the terminating telephone number is being used as a modem connection. For example, if the TMOU for the termination telephone number is less than a predetermined value, a determination may then be made that the number is not being used as a modem connection. However, if the TMOU is greater than the predetermined value, further analysis may be performed to make a final determination. These determinations may include whether the AHT is above a predetermined value, the AMOU is above a predetermined value, as well if Ncallers is above a predetermined number. If one or more of these values meets a predetermined criteria, a determination may be then made that the terminating telephone number and make an absolute determination. As an additional step, a manual process may then be employed to physically call the terminating number in order to determine that this is so. An additional step which may be performed once a terminating telephone number is identified as a modem connection, is calculating the financial value of the time in which a connection was established to a particular terminating telephone number.

In one configuration of the invention, the system described herein may be employed in a SS7 telecommunications network. In such a network, calls to a particular CLEC are routed through a designated signal transfer point (STP). As such, the monitoring device may be incorporated in a service control point (SCP) which is in connection with the STP. Alternatively, the monitoring device may be a separate component connected to the STP. The modem identifier may further be in connection with this monitoring device or incorporated therein. The modem identifier described herein may be implemented on a computing device such as a network server or a personal computer.

Processing modules may be included in the modem identifier which provide for the extraction of information from calls routed through the STP, compilation of selected information with regards to the calls, and for the comparison of this selected information against predetermined reference values. The results of this analysis may then be provided through any number of output means which includes generation of a display on a computer screen as well as creation of hard and soft copies. Further, a processing module may also be included in the modem identifier system for making financial calculations as to connection time established with terminating telephone numbers which have been determined to be modem connections. This information may also be provided via the output means described above.

DETAILED DESCRIPTION

Figure 1:
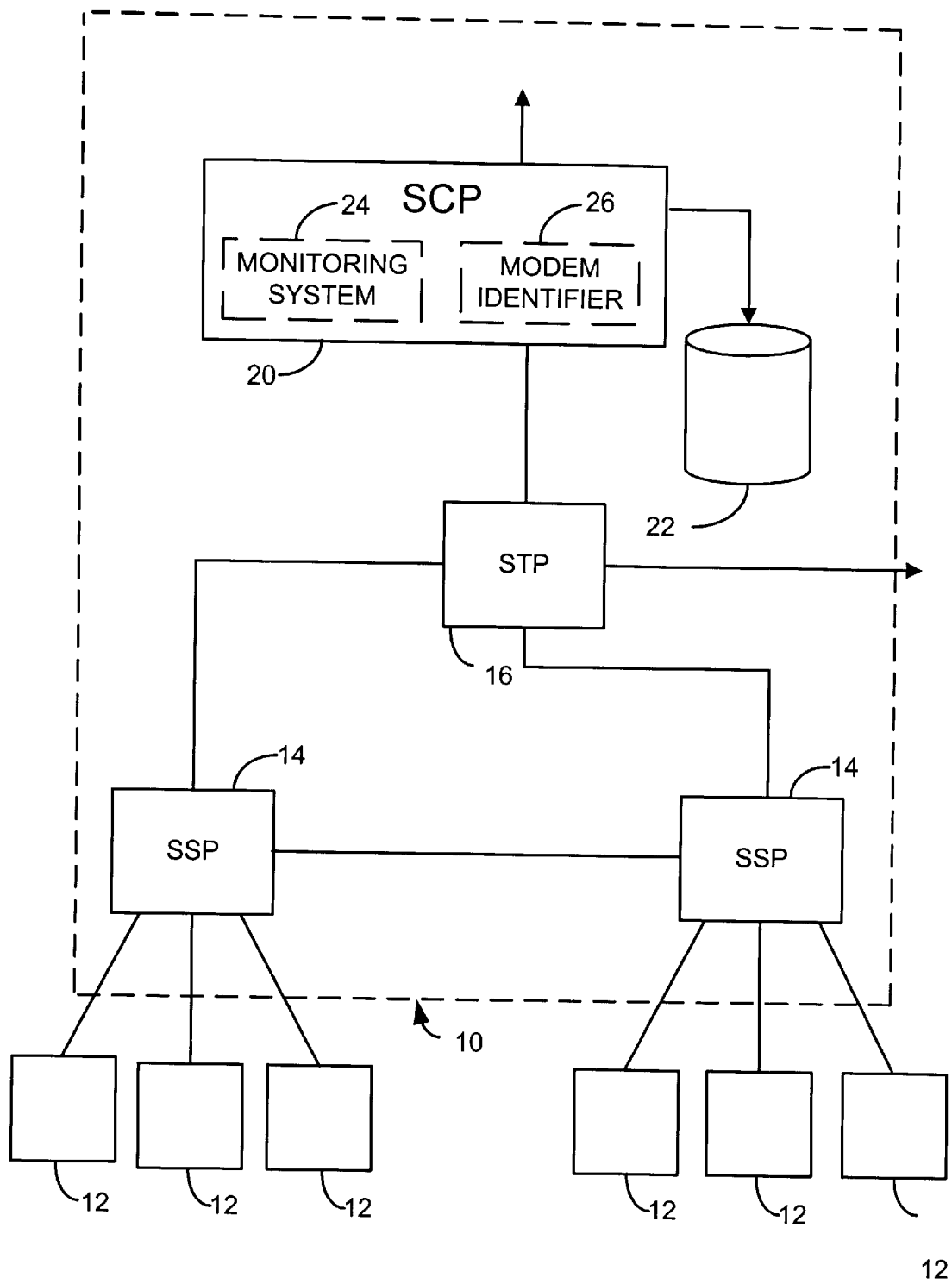
FIG. 1 discloses a system diagram for a telephone network including a connection with a competitive local exchange carrier (CLEC).

Disclosed in FIG. 1 is a system diagram for a portion of a SS7 telecommunications network 10. Through this telecommunications network, telephone or computer users may establish a telephonic connection with remotely located parties or entities. In the diagram, the callers or computer users 12 may employ a telecommunications device such as a telephone, fax machine or computer modem in order to establish a connection with the network 10. Telephonic connections are initially established through signal switching points (SSP) 14 which provide for the origination, termination or tandeming of telephone calls. The SSP may send signaling messages to other SSPs to set up, manage, and release voice circuits required to complete a call.

Network traffic between signaling points may be routed via a packet switch call to a signal transfer point (STP) 16. The STP routes each incoming message to an outgoing signal link based on routing information contained in the SS7 message received from the particular SSP. The STP provides improved utilization of the SS7 network by eliminating the need for direct links between signaling points. In most cases STPs are usually deployed in mated pair configurations in separate physical locations to ensure network wide service in the event of an isolated failure.

In connection with the STP 16 may be the service control point (SCP) 20. The SCP provides certain automated functions which may be employed by the network. Incorporated into or in connection with the SCP 20 is a monitoring system 24 which may be employed to monitor telephone traffic processed by STP 16. Alternatively, the monitoring system may be a separate system which is electrically connected with SCP 20. In particular, the monitoring system 24 is configured to monitor all telephone traffic to particular terminating telephone numbers, including those serviced by particular competitive local exchange carriers (CLEC). Further incorporated in the SCP is the modem identifier 26 which is configured to compile and analyze data collected by the monitoring system. As with the monitoring system, the modem identifier 26 may be a separate component which is electrically connected with the SCP 20.

According to the system disclosed in FIG. 1, when a telephone call is placed by a user 12, if it is to a termination telephone number serviced by a particular CLEC, it will be routed through a STP which handles all call routing for that CLEC. The SCP in connection with the STP will monitor all the calls according to termination telephone number, and will extract information from those calls which is employable in the analysis described below.

According to agreements established between local exchange carriers (LECs) and particular CLECs, the routing of telephone calls to and from CLEC telephone networks may require the payment of certain fees. In particular, if a LEC routes a call to a CLEC, the LEC may be required to pay a fee, where the amount may be dependent on the connect time for the particular call. Because of certain rulings made by the Federal Communications Commission, it may be significant if a call either to or from a CLEC telephone network is being made for the purposes of establishing a data connection to the Internet. If a call is determined to be a Internet data connection, this may affect the amount of reciprocal compensation which the parties transfer between themselves.

In order to provide for the accounting of these calls to and from the CLECs network, a monitoring system 20 is employed which compiles information for these calls. For each call either received from or forwarded to the CLEC telephone network, a call detail record may be created which may be stored in database 22. Information included in the call detail record may include a call code which indicates the direction of the traffic, a call date, an originating telephone number, a terminating telephone number, an indication of whether the call was successful, as well as call conversation minutes of use.

Figure 2:
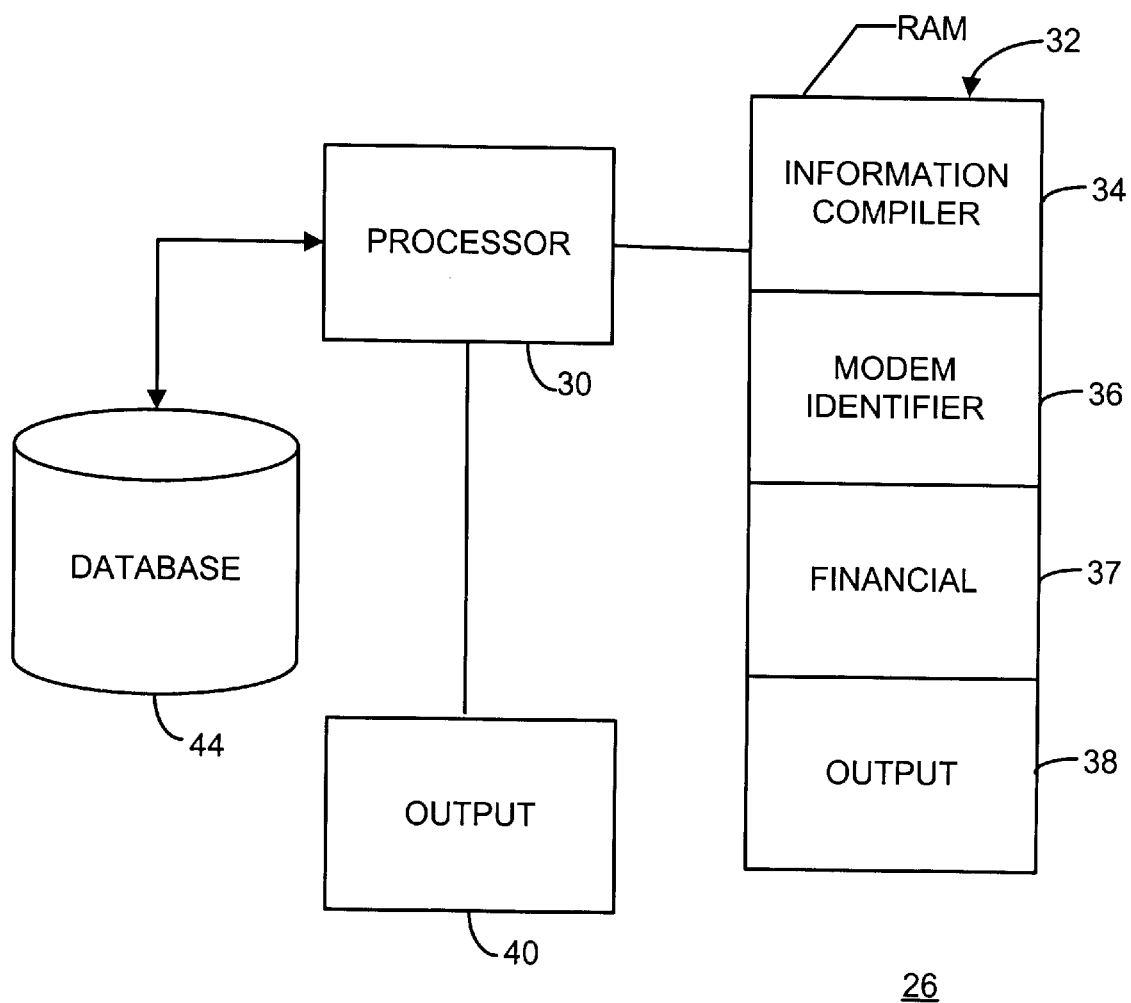
FIG. 2 discloses a system diagram for the system monitors which monitors telephone traffic between a local exchange carrier (LEC) and a particular CLEC.

Disclosed in FIG. 2 is a system diagram of the modem identifier 26. The modem identifier may be employed in conjunction with any number of monitoring systems currently in use for monitoring telephony traffic between telecommunication networks. One such system is the CroSS 7 employed by U S WEST. The system disclosed in FIG. 2 may be implemented on any number of computing devices. They may include a personal computer, as well as a network server. Included in the modem identifier system 26 may be a processor 30 which controls the internal functions of the system and provides for the input and output of information from the system. In connection with the processor 30 is random access memory (RAM) 32. Loaded in RAM are a number of processing modules which may be employed to collect and analyze the information needed to perform the modem identification functions. The processing modules include the information compiler 34 which may be employed to compile selected information about a particular termination telephone number, modem identifier 36 which is employed to analyze the selected information, financial module 37 which provides financial calculations based on connect time for particular terminating telephone numbers, and an output module 38 which provides for formatting of information generated in a desired format.

In connection with the processor 30 is database 44 which is employed to store information gathered and processed by the modem identification system 26. Information generated by the system described may be transmitted to an output device 40 such as a screen display or a printer.

In operation, phone calls are routed in the telephone network in a manner which is typical for a public switch telephone network (PSTN). For example, when a user wishes to place a telephone call, a connection is first established with the local SSP 14 which in turn establishes a line of communication with the STP 16. The STP then provides information with regards to the routing of the telephone call. In the situation where the telephone call will stay within the local PSTN, the STP will provide the instructions and the SSP will route the call to the designated SSP for the termination telephone number. Alternatively, when the telephone call is to be routed to another telephone network, such as one serviced by a CLEC, the STP associated with the particular network will provide for the routing.

Included in, or in connection with, the SCP is the monitoring system 24 which, as described above, analyzes telephone calls passing through the particular STP. When a call is received from or routed to another network, such as a CLEC, the monitoring system extracts this relevant information and in turn provides this to the modem identification system for compiling.

Figure 3:
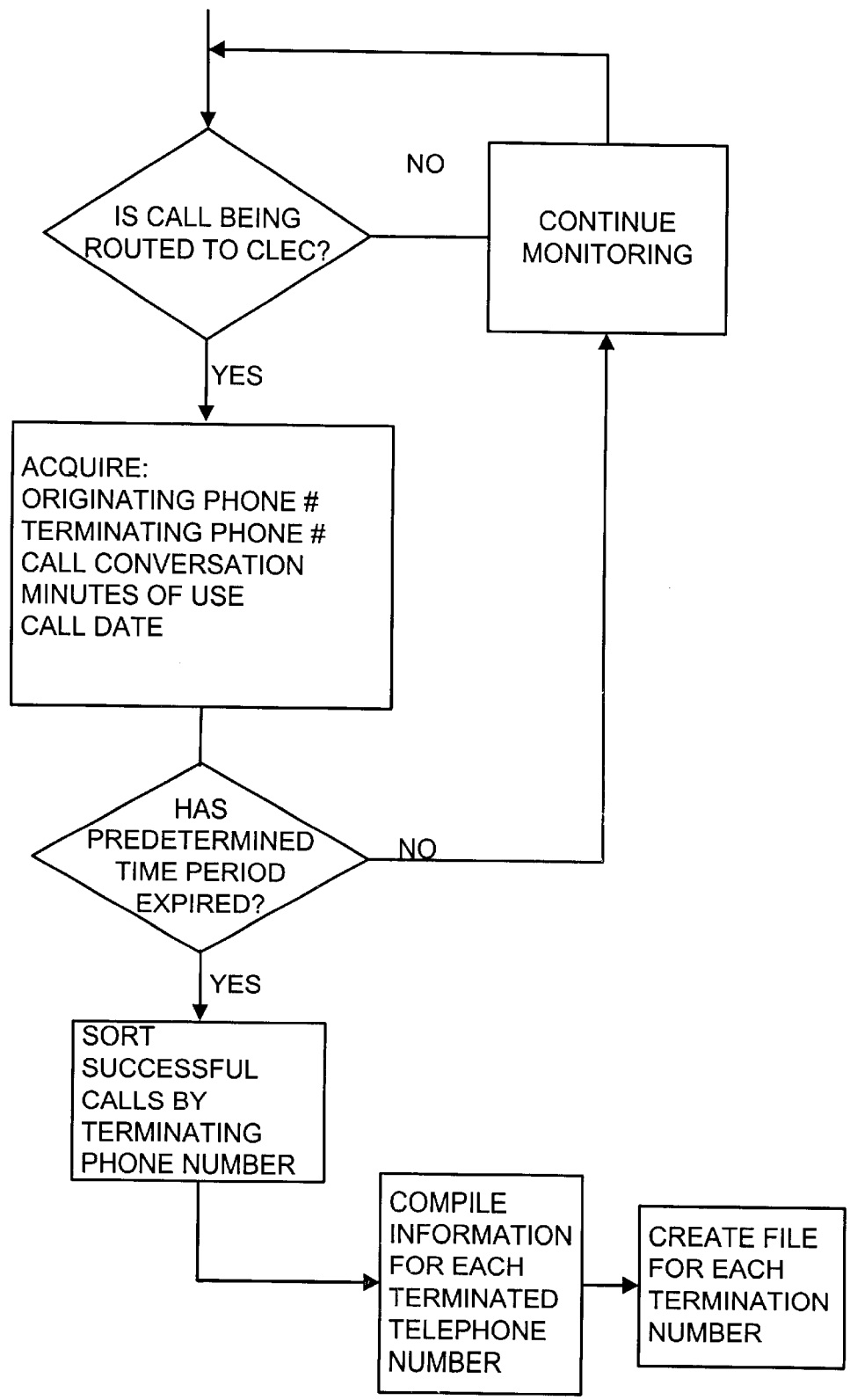
FIG. 3 discloses a flowchart which describes the operations performed at the systems monitor for compiling the telephone call information with regards to particular termination telephone numbers.

Disclosed in FIG. 3 is a flowchart which describes in detail the operations performed by the monitoring system and modem identification system when extracting and compiling information on telephone calls routed to termination numbers serviced by a CLEC. As a first query, it is determined whether a call being processed at the STP is being routed to the particular network. If the call is not being routed to the network, the monitoring process continues. If it is determined that the call is going to the particular network, certain information may then be extracted and stored. This information includes the originating telephone number, terminating telephone number, call conversation minutes of use, and call date. This information may then be stored in a designated location in database 44.

Once the information is stored, a query may then be made as to whether a predetermined period of time for the monitoring has passed. If the time period has not passed, the monitoring continues. If predetermined time period, such as a week or month, has passed, a compile function for the stored data may be performed. This compile function may first sort successful telephone calls by terminating telephone number. A separate table may then be created in database 44 for each of these terminating telephone number. A number of different types of information may then be compiled for each of the terminating telephone numbers. The compiled information may include total minutes of use (TMOU) over a predetermined period of time, the average call holding time (AHT) and the average minutes of use per caller (AMOU) over the predetermined period of time, and the total number of callers during the predetermined period of time (Ncaller).

Once the information for each terminating telephone number is compiled, an analysis may then be performed to determine if the terminating telephone is being employed as a modem connection. In order to make this determination, one or more reference values are employed in order to make comparisons against the compiled data. Specifically, the reference values are used to make comparisons against the compiled information to determine in what situations telephone traffic to a particular terminating telephone number exceeds one or more of these reference values. If enough of the reference values are exceeded, a determination can be made with significant certainty that the originating telephone call is a modem call and thus the termination telephone number is being employed as a modem connection. This identification may be later confirmed by actually placing a call to the identified destination telephone number to determine if it is indeed a data connection.

Figure 4A:
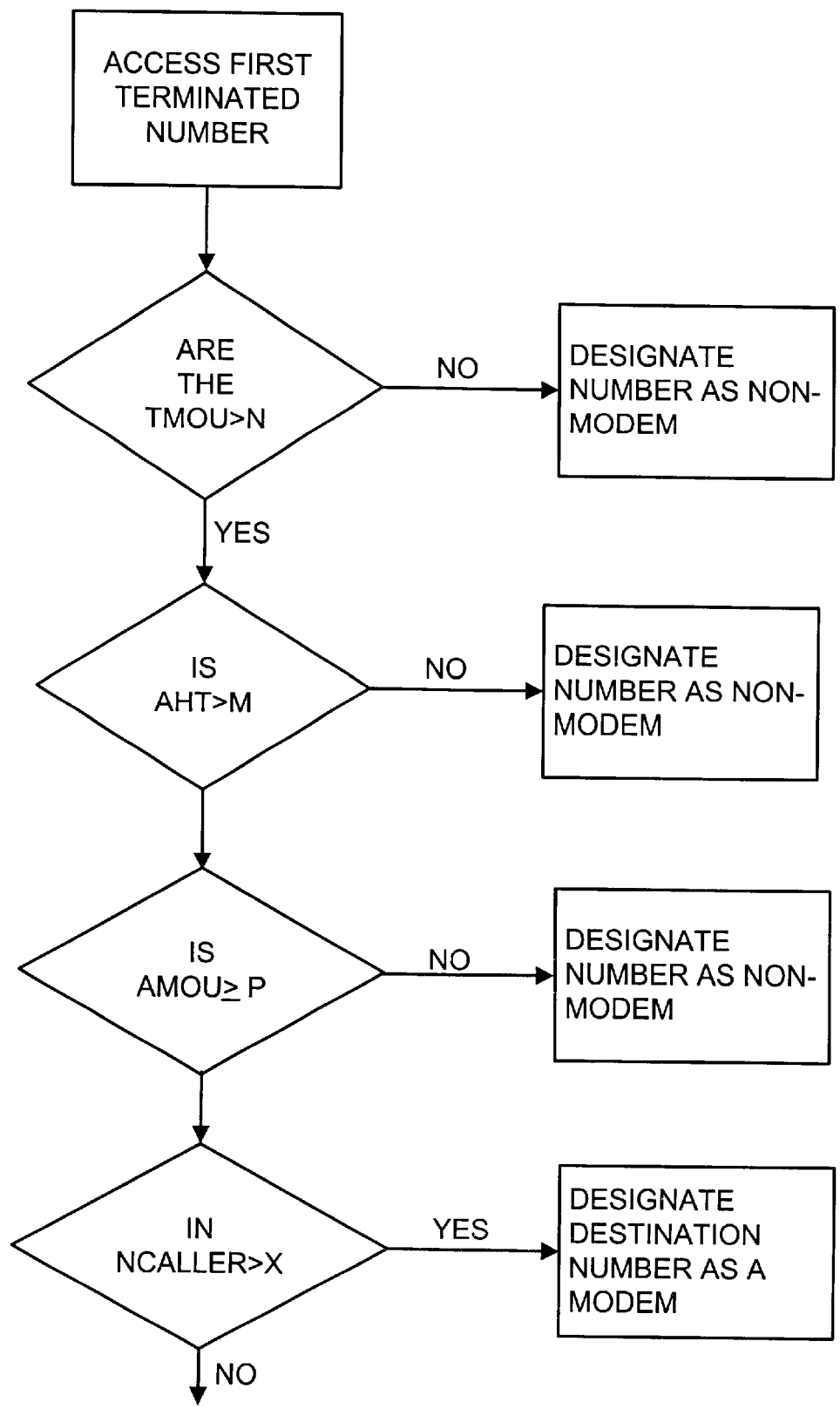
FIG. 4 discloses a flowchart which describes the operations of the system in order to make a determination as to whether a particular terminating telephone number is a modem.
Figure 4B:
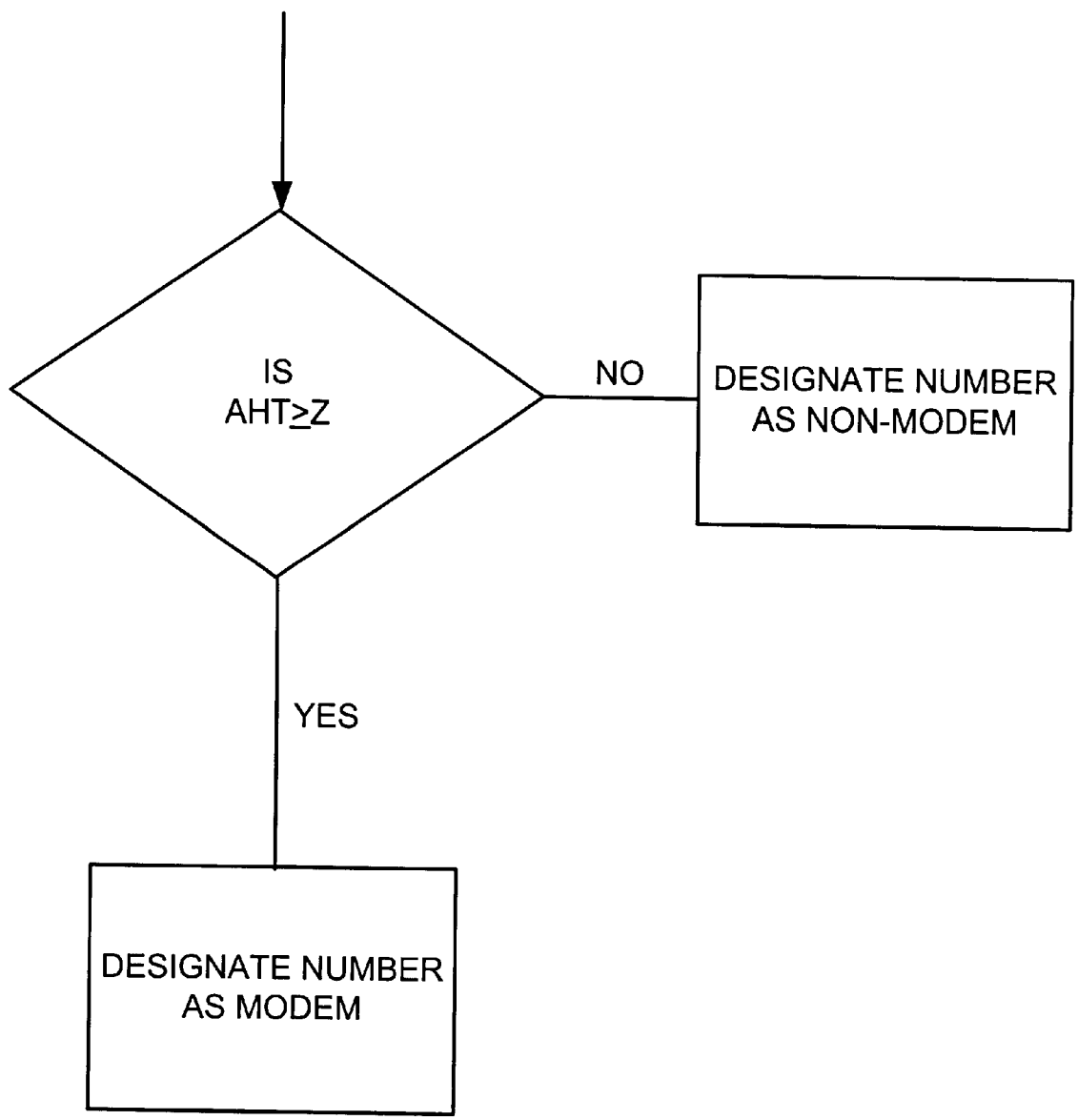

Disclosed in FIGS. 4a and b is an example of a process which may be employed in order to determine whether a particular terminating telephone number is a modem connection. Employed in the process are a number of reference values. These reference values may be compiled through past analysis of a telephone network with regards to recorded characteristics of telephone calls which have been placed to terminating telephone numbers which are known to be modem connections. As a first step, the particular file in the database containing the compiled information for a particular termination number is first accessed. As a first query, it is determined whether the total minutes of usage (TMOU) over the predetermined period of time is greater than a predetermined number N. If the total minutes of use for the destination telephone number does not exceed N, then the termination telephone number may be designated as non-modem.

However, if the TMOU is greater than N, a second query is made as to whether the average call holding time (AHT) is greater than a predetermined number M. The first step in determining AHT is calculating the total completed peg count (TCPC) over this period of time. TCPC is the total number of successful calls to this particular terminating telephone number. AHT is then equal to the TMOU/TCPC. If the AHT is not greater than M, the terminating telephone number is designated as non-modem. If it is determined that AHT is greater than M, the next step in the analysis is performed.

The next step in the query is to whether the average minutes of usage (AMOU) is greater than a predetermined value P. When the information to be analyzed is compiled, one of the pieces of information generated is the total number of originating telephone numbers that successfully make a call to the termination telephone number (Ncaller). AMOU may then be determined by dividing TMOU by Ncaller. If it is found that AMOU is not greater than P, the terminating telephone number is designated as non-modem. If it is determined that AMOU is greater than P, the next step in the analysis may be performed.

The next query to be made is whether the number of individual callers (Ncaller) to the termination telephone number during the predetermined period of time is greater than a predetermined value Q. If the number of callers is greater than Q, the designated termination telephone number may be identified as a modem. If the Ncallers is less than Q, an additional query may then be made. This additional query is to whether the AHT for the calls is greater than a number predetermined value Z. If the AHT is greater than its predetermined value, the termination telephone number may then be designated as a modem number. If the AHT is less than the predetermined value, the termination telephone number is then designated as a non-modem.

Once the analysis is complete, the termination telephone numbers which are identified as a modem, can be then put in a single list. All of the other numbers may then be identified as non-modem and removed from further consideration. Once a number is initially identified as modem, a system may then be employed to call the termination telephone number and positively determine that the number is a modem connection versus a voice or fax connection. The ability to identify a modem versus a fax machine is well known in the art.

As a final step, financial calculations may be performed by the system with regards to assigning a monetary value to the calls which have been placed to a terminating telephone number which is known to be a modem connection. In this regards connect time to the particular termination telephone number may be assigned a per minute rate which is then multiplied by TMOU over the predetermined period of time. This monetary value may then be further used in calculating reciprocal compensation.

The foregoing description of the present invention has been presented for purposes of illustration and description. Furthermore, the description is not intended to limit the invention to the form disclosed herein. Consequently, variations and modifications commensurate with the above teachings, and the skill or knowledge of the relevant art, within the scope of the present invention. The embodiments described hereinabove are further intended to explain best modes known for practicing the invention and to enable others skilled in the art to utilize the invention in such, or other, embodiments and with various modifications required by the particular applications or uses of the present invention. It is intended that the appended claims be construed to include alternative embodiments to the extent permitted by the prior art.

What is claimed is:

1. A method for identifying data network traffic over a telephone network, comprising the steps of:
    monitoring a plurality of telephone calls to at least one termination telephone over a predetermined period of time;
    for each of the telephone calls monitored over the predetermined period of time, compiling selected information for all successful telephone call established with the at least one termination telephone number over the predetermined period of time, wherein the selected information includes at least one of:
        total minutes of use (TMOU) for the successful telephone calls to the at least one termination telephone number over the predetermined period of time;
        average hold time (AHT) for the successful calls to the at least one termination telephone number over the predetermined period of time;
        average minutes of use (AMOU) per caller for the successful calls to the at least one termination telephone number during the predetermined period of time; and
        total number of different callers (Ncaller) to the at least one termination telephone number during the predetermined period of time;
    comparing portions of the selected information accumulated over the predetermined period of time against predetermined reference values and based on the comparison making a determination as to whether the at least one destination telephone number is a modem connection; and
    if one or more telephone numbers are identified as modems, aggregating total time for the successful telephone calls to the at least one termination telephone numbers which are classified as the modem connections and calculating a monetary value for each of the at least one termination telephones based on TMOU multiplied by a selected rate.

2. The method of claim 1 wherein the at least one terminating telephone number is serviced by a competitive local exchange carrier (CLEC).

3. The method of claim 1 wherein the step of compiling includes creating a listing of all successful calls made to the at least one terminating telephone number.

4. The method of claim 3 wherein the step of compiling selected information includes collecting at least one of the following:
    originating telephone number for the successful telephone call;
    terminating telephone number for the successful telephone call;
    the call conversation minutes of use for the successful telephone call; and
    date of the successful telephone call.

5. The method of claim 1 wherein the at least one termination telephone number is determined to be a modem connection if at least one of TMOU, AHT, AMOU, and the NCaller is greater than a predetermined value.

6. The method of claim 2 wherein the monetary value is further employed in a calculation of reciprocal compensation with the CLEC.

7. A system for identifying modem connections in a telecommunications network, comprising:
    a monitoring system in connection with a switch in the telecommunications network configured to extract call information for a plurality of successful telephone calls routed to at least one terminating telephone number; and
    a modem identifier configured to compile the call information extracted by the monitoring system for all the successful telephone calls over a predetermined period of time to the at least one terminating telephone number, wherein the compiled call information for the at least one terminating telephone number comprises at least one of: total minutes of use (TMOU) for the successful telephone calls to the at least one termination telephone number over the predetermined period of time, average hold time (AHT) for the successful calls to the at least one termination telephone number over the predetermined period of time, average minutes of use (AMOU) per caller for the successful calls to the at least one termination telephone number during the predetermined period of time, and total number of different callers (Ncaller) to the at least one termination telephone number during the predetermined period of time;
    said modem identifier is further configured to compare the compiled call information against at least one reference value to determine whether the at least one terminating telephone number is one of the modem connections; and
    a processing module which calculates a monetary value with regards to monitored use of the at least one termination telephone number which are employed as one of the data modems.

8. The system of claim 7 wherein the at least one terminating telephone number is serviced by a competitive local exchange carrier (CLEC).

9. The system of claim 8 wherein the switch is a signal transfer point (STP) in a public switched telephone network (PSTN) specially designated to route calls to a designated CLEC.

10. The system of claim 7 further including a modem search device employable to physically call each of the at least one termination telephone numbers which have been identified as the modem connections to confirm the at least one termination telephone numbers is one of the modem connections.

11. The system of claim 7 wherein the extracted call information includes at least one of:

originating telephone number for the successful telephone call;

terminating telephone number for the successful telephone call;

the call conversation minutes of use for the successful telephone call; and date of the successful telephone call.

12. The method of claim 7 wherein the monitor and modem identifier are incorporated in a service control point (SCP) of the telecommunications network.

13. The system of claim 8 wherein the processing module is further configured to employ the monetary value in a calculation of reciprocal compensation with the CLEC.

* * * * *